May 15, 1945.   R. G. LE TOURNEAU   2,375,801
MATERIAL MOVING IMPLEMENT
Filed Aug. 29, 1942   4 Sheets-Sheet 1

INVENTOR
R. G. LeTournea
BY
ATTYS

May 15, 1945.   R. G. LE TOURNEAU   2,375,801
MATERIAL MOVING IMPLEMENT
Filed Aug. 29, 1942    4 Sheets-Sheet 4

INVENTOR
R. G. LeTourneau
BY
ATTYS

Patented May 15, 1945

2,375,801

UNITED STATES PATENT OFFICE 2,375,801

MATERIAL MOVING IMPLEMENT

Robert G. Le Tourneau, Peoria, Ill., assignor to R. G. Le Tourneau, Inc., Stockton, Calif., a corporation of California Application August 29, 1942, Serial No. 456,620

15 Claims. (Cl. 37—144)

This invention relates to self-propelled implements, and particularly to one which includes, as a unitary combination, a tractor, a material engaging device mounted thereon and tractor actuated control means for the device.

One object of the invention is to provide a combination unit of the above general character which includes a front end material engaging device directly supported on and pushed by the tractor, a power control unit including a cable drum driven by the tractor and mounted at the front end thereof directly behind the device, and cable engaging means arranged so that the cable connection between the drum and device may be made with a minimum length of cable and number of sheaves.

Another object is to provide, in a unit as above outlined, control means for the power control unit arranged so that the latter may be conveniently operated and the device controlled from the driver's seat on the tractor without the use of any complicated actuating or connection means.

A further object is to provide an improved mounting for the power control unit, adapted to be removably secured on a standard form of tractor without making any alterations to the latter, and which in addition serves to protect and shield the relatively delicate tractor radiator from possible harm. Also the above mounting is so arranged that the mounting and power control unit may be readily mounted on or removed from the tractor as a unit without disturbing any standard tractor part.

A portion of the power control unit when thus mounted is unavoidably exposed at the front of the tractor where there is possible danger of its being struck and damaged from in front; and therefore a further object of the invention is to provide the power control unit mounting means with a protecting device for said unit, and which also serves as a protection for the tractor itself.

A still further object is to provide a simple drive connection device between the front end of the tractor engine shaft and the rear end of the operating shaft of the power control unit, so arranged that the necessary drive connection may be made without altering or interfering with the engine shaft in any way, and so that the power control unit may be disconnected from the engine shaft whenever desired.

A further object of the invention is to produce a simple and inexpensive device, and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Figure 1:
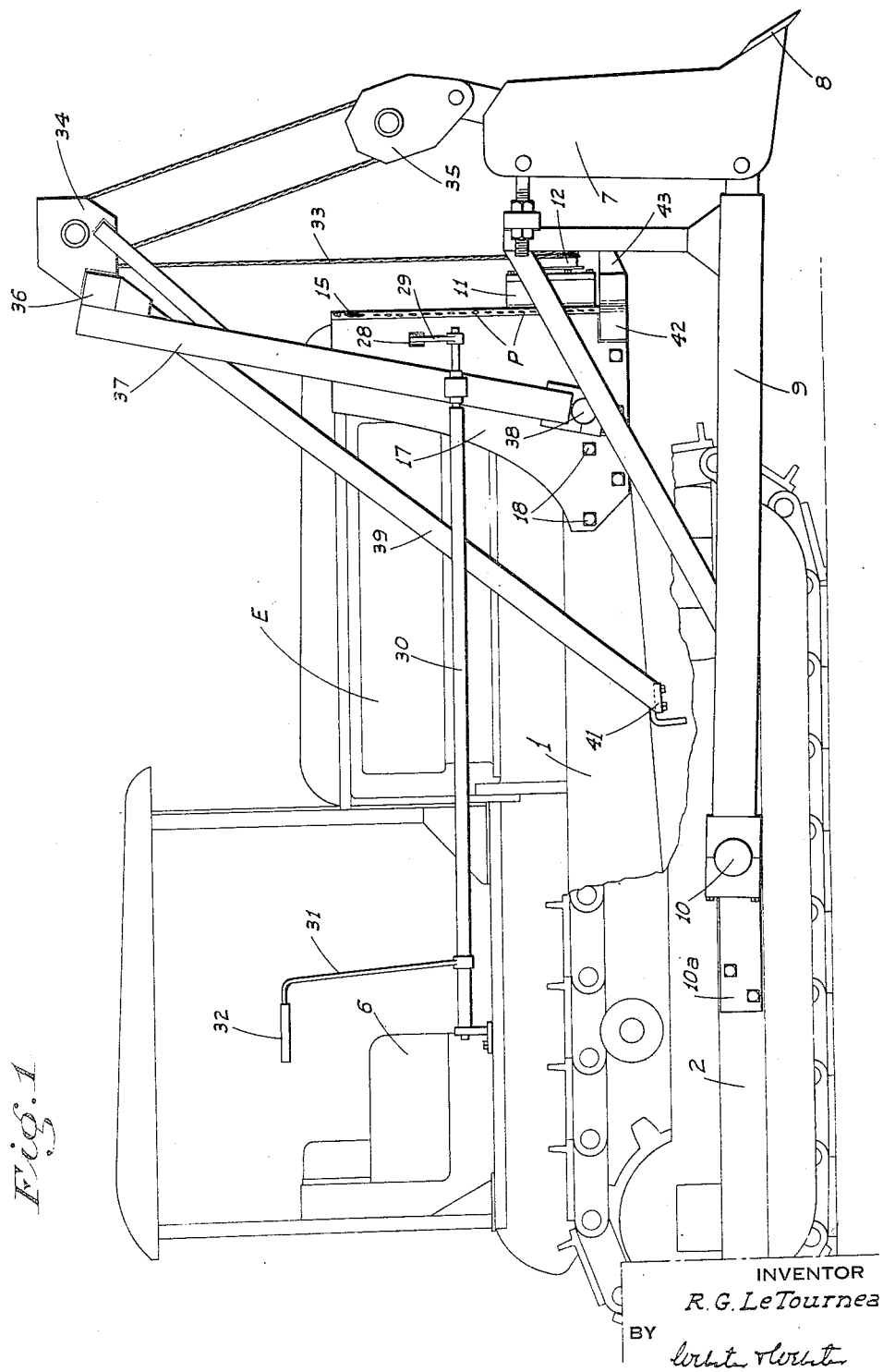
Figure 1 is a side outline of my improved combination implement.
Figure 2:
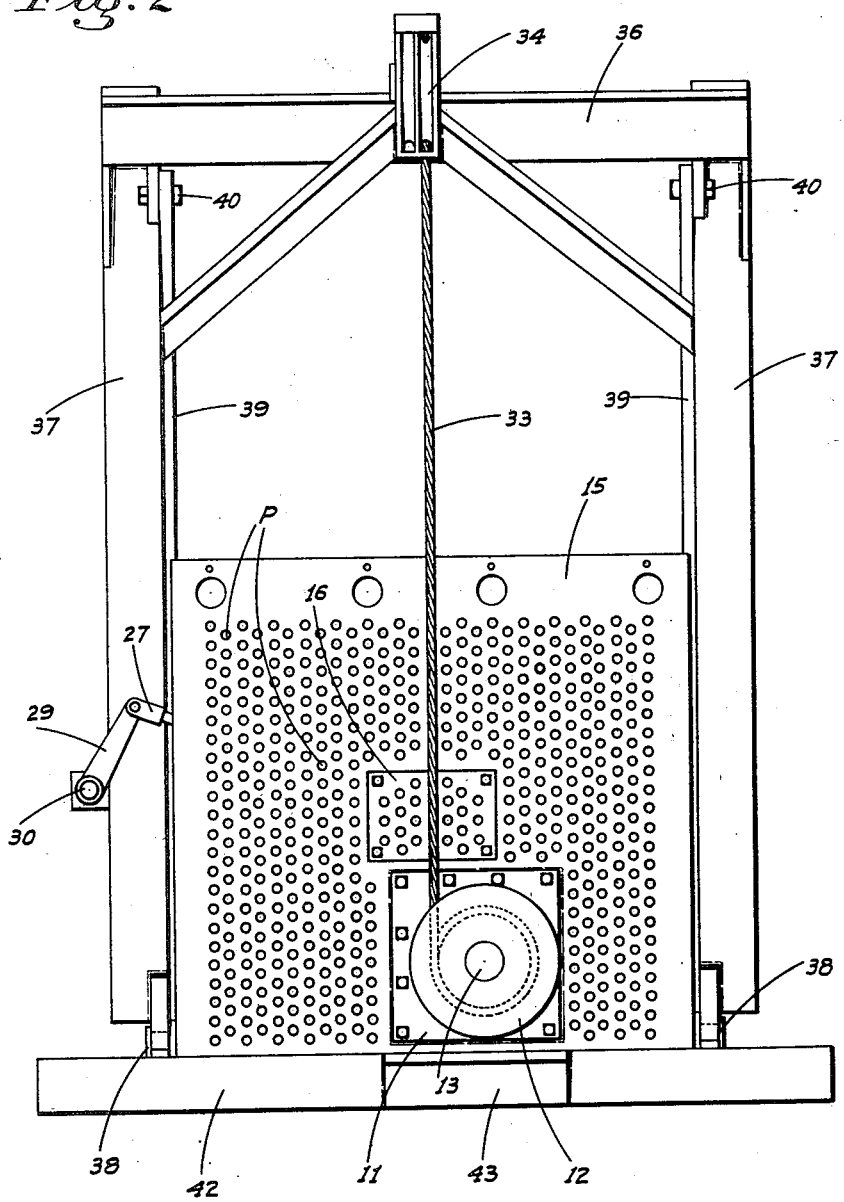
Figure 2 is a front elevation of the power control unit and its supporting shield plate, shown in connection with the sheave block mounting frame; the assembly as a whole being detached from the tractor.
Figure 3:
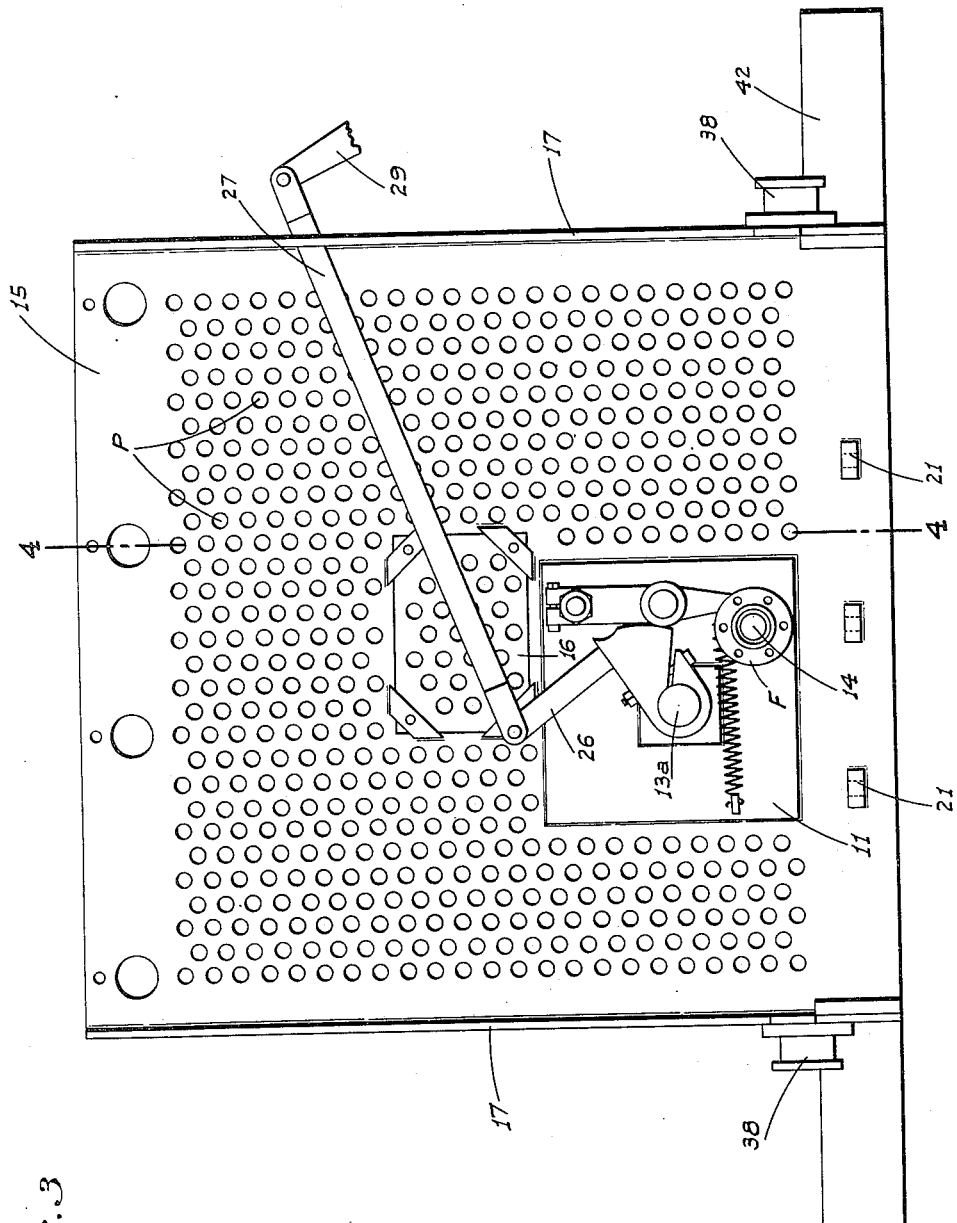
Figure 3 is a rear end of the power control unit and its mounting plate, with the sheave mounting frame removed.

Referring now more particularly to the characters of reference on the drawings, the tractor forming a part of the implement assembly is here shown as being a standard endless track tractor which includes side frames 1, endless track supporting frames 2, and an engine E having a drive shaft 3 projecting from the front end of the engine, and carrying as usual a fan belt pulley 4 on its outer end, disposed just behind the front end radiator 5 of the tractor. The operator of the tractor occupies a seat 6 on the tractor adjacent its read end, as usual.

The material engaging device of the assembly is here shown as being a bulldozer or push grader which comprises an upstanding body 7 extending transversely of the tractor and having a blade 8 along its lower edge. A supporting frame is attached to the body and includes side push arms 9 projecting rearwardly from the body and detachably pivoted at their rear end on trunnions 10 secured on and projecting laterally out from plates 10a bolted against the track frames 2 intermediate the ends of the latter. Any equivalent or desired means of attaching the side arms may of course be employed in place of the perpendicular means here shown, which in itself forms no part of the invention.

The arms 9 are swung up or down, to raise or lower the body 7 and blade 8, by means of a power control unit or power winch of standard character, which is preferably of the type shown in my co-pending application for patent, Serial No. 429,123, filed January 31, 1942. This unit includes a main housing 11 of rectangular form in cross section, and a cable drum 12 disposed in front of the housing and mounted on a shaft 13 journaled in the housing 11. As shown in said application, the power control unit also includes a drive shaft 14 projecting from the rear end of the housing below and laterally offset from the shaft 13.

Figure 4:
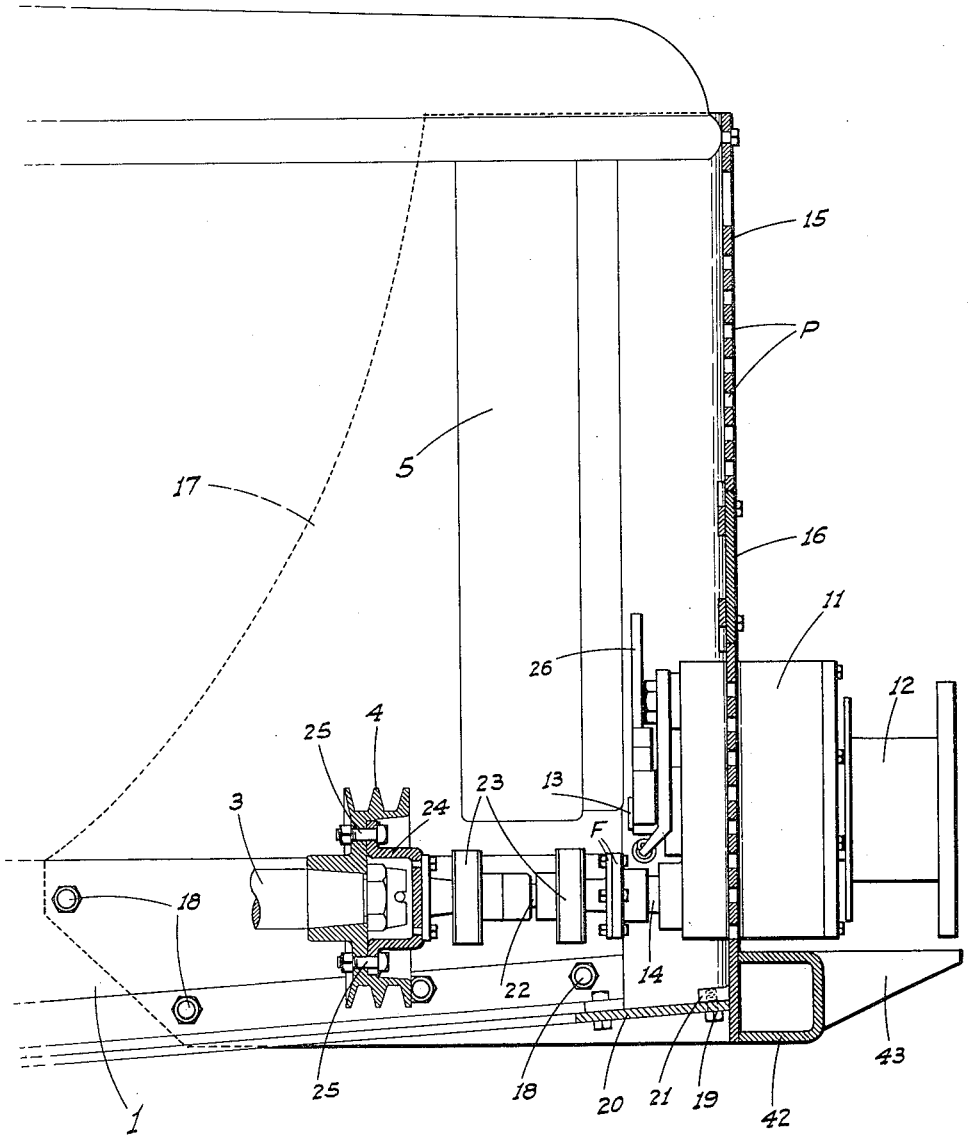
Figure 4 is a longitudinal sectional elevation on the line 4—4 of Fig. 3, but showing the shield plate as mounted on a tractor and the power control unit connected to the tractor engine drive shaft.

In order to support the unit in fixed connection with the tractor, the housing 11 projects through and is welded intermediate its front and back edges into a shield, comprising an upstanding relatively heavy plate 15 which is of a size to extend completely over the front of the radiator 5 and freely perforated as at P so as not to obstruct the flow of air to the radiator, while at the same time leaving the plate stiff and strong. Said plate 15 is provided with a relatively small removable inspection or unit adjustment plate 16 inset into the plate 15, as shown in Fig. 4, and disposed just above the housing 11. Said plate 15 is formed with side wings 17 adapted to surround the sides of the radiator and to closely overlap the forward portions of the side frames 1, to which they are secured by suitably disposed bolts 18. The plate 15 may be additionally secured to the tractor by cap screws 19 which project through a substantially horizontal front cross plate 20 of said frames 1, and into lugs 21 projecting from the back of the plate 15. A different form of shield securing means may of course be used as the frame arrangement of different types of standard tractor may require.

The shield when thus mounted is disposed a sufficient distance in front of the radiator 5 so that the latter clears the rear end portion of the power control unit and the operating mechanism thereof as shown in Fig. 4, and the housing 11 is disposed laterally in the shied so that the shaft 14 is substantially alined with the engine shaft 3. These shafts are connected in driving relation by a coupling unit 22 which includes flexible couplings 23 and a flanged cup 24 at its rear end adapted to enter the pulley 4 in surrounding relation to the forwardly projecting end of shaft 3, and to be removably secured to the pulley by bolts 25. The coupling unit in turn is detachably connected to the shaft 14 by cooperating flanges F on their adjacent ends, and which are removably bolted together, as indicated in Fig. 4. Since the pulley 4 is keyed on the shaft 3 the power control unit shaft 14 is in effect directly connected to the engine shaft and constantly turns as long as the engine shaft is turning and at the same speed.

The functioning of the power control unit is controlled by a slight rotation of a shaft 13a, alined with shaft 13, and projecting from the rear end of housing 11. To this end, an upstanding actuating arm 26 is secured on the rear end of said shaft as shown in my Patent No. 2,220,655, dated November 5, 1940. In order to operate this arm from the driver's seat 6 on the tractor, a link 27 extends laterally from the arm and through an opening 28 in one wing 17 to a connection with a depending arm 29 on the outside of the shield. The arm 29 is connected at its outer end on the forward end of a shaft 30 which extends lengthwise of the tractor along one side thereof to a rearward termination adjacent the seat 6. Adjacent the rear end of said shaft 30, an upstanding lever 31 is secured thereon, said lever terminating in a rearwardly projecting handle 32 convenient to the occupant of the seat so that said lever may be radially swung laterally to thus oscillate the shaft 30 and correspondingly the shaft 13.

In order to connect the drum cable 33 with the implement body 7 so as to raise and lower the latter, the cable extends upwardly from the drum 12 and over a top sheave block 34, and is then reeved between said block and a lower sheave block 35 which is swivelly connected to the body 7 at the top and centrally between its side edges and from which said body is suspended. The block 34 is rigidly mounted on a cross beam 36 in forwardly projecting relation therefrom, said beam being some distance above the shield and being rigidly secured at its ends on depending side beams 37. These beams are closely spaced from the wings 7 on the outside thereof and at their lower ends engage and are removably mounted on trunnions 38 projecting laterally out from said wings 17 near the lower end of the latter.

The beams 36 and 37 form a rigid sheave block supporting frame straddling the shield, the beam 37 being disposed with a forward slope from their lower end so that the block 34 is disposed directly above the drum 12. The beams 37 are prevented from turning on the trunnions 38 by straps 39 which depend from removable connection with the beams 36 and 37 at their junction as at 40, to detachable connection as at 41 with the lower edges of the side frames 1 some distance rearwardly of the shield.

It will thus be seen that while the operation of the implement is controlled from the driver's seat, the power control unit itself is mounted closely adjacent the implement so that great compactness is assured, and the length of cable needed for operating the implement is accordingly reduced. Also the number of pulleys about which the cable must pass between the drum and implement is reduced considerably over what has heretofore been necessary.

While a bulldozer is here shown as being the material engaging unit device, other forms of front end implement may be used without interfering with or changing the operation or mounting of power control unit or the sheave block supporting frame. If the tractor is to be used for any length of time without any implement, the sheave supporting frame may be dismounted without disturbing the shield, which may be left on the tractor if desired. Also the power control unit may be disconnected from the engine at any time by uncoupling and removing the coupling unit 22.

The body 7 of the implement of the type here shown extends upwardly in front of the power control unit drum 12 and protects the latter from being struck by any material engaged by the implement. In order to protect the power control unit and shield from possible damage in the event that the tractor is being used with a relatively low implement or without any implement, the shield is provided along its lower edge on the forward side with a heavy bumper beam 42 which extends laterally some distance beyond the wings 17 and is located directly below the housing 11, while a protecting nose 43 projects forwardly from the bumper directly under the drum 12 to its forward end, as shown in Fig. 4.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A material moving implement including in combination, a tractor having a driven engine shaft, a vertically movable material engaging device mounted on the tractor and disposed in front of the same, a power control unit including a housing, a front end exposed cable drum and a drive shaft; means mounting the unit on the tractor in front of the same and including an upstanding shield mounted on the tractor and on which the housing is secured so that the drum is in front of the same, a drive connection between said drive and engine shafts, an upstanding frame mounted on the shield in straddling relation and extending above the same, a sheave on said frame at the top and a cable from the drum extending upwardly about the sheave and thence downwardly to the device in suspending relation.

2. A combination as in claim 1, with side brace straps extending downwardly and rearwardly from the frame adjacent the top thereof to connection with the tractor rearwardly of the shield.

3. Means to mount a power control unit on a tractor at its front end and ahead of the radiator thereof, the tractor including side frames and the unit including a housing; said means comprising a rigid, upstanding shield including a front plate extending across and of a size to cover the radiator and on which the housing is secured, and means to secure the shield to the side frames so that the plate and housing are spaced from the radiator.

4. A structure as in claim 3, in which the housing projects through the plate and is welded intermediate its front and back faces thereto.

5. A structure as in claim 3, in which the housing projects through the plate and the control devices of the unit project from the back face of the housing.

6. A structure as in claim 3, in which the housing projects through the plate and the control devices of the unit project from the back face of the housing, the plate including a removable inspection plate mounted thereon immediately above the housing.

7. Power control unit mounting means as in claim 3 in which said plate is formed with air passage openings therethrough.

8. Power control unit mounting means for a tractor which includes a radiator at its forward end, and side frames, the power control unit including a housing and a cable drum projecting forwardly from said housing; said mounting means comprising a rigid upstanding shield forming plate disposed in protective relation ahead of the tractor radiator, the power control unit housing projecting through and being secured to said plate with the cable drum ahead of the latter, and means securing the shield to the side frames so that said plate and housing are spaced from the radiator.

9. Power control unit mounting means as in claim 8 in which the unit includes control devices extending exteriorly of the housing, said control devices being disposed to the rear of said shield forming plate.

10. Power control unit mounting means for a tractor which includes a radiator at its forward end, and side frames, the power control unit including a housing and a cable drum projecting forwardly from said housing; said mounting means comprising a rigid upstanding shield which includes a front plate disposed in protective relation ahead of the radiator and side wings projecting rearwardly from the side edges of said plate, the power control unit housing projecting through and being secured to said front plate with the cable drum disposed ahead of the latter, and means securing said side wings to the tractor side frames so that the front plate and housing are spaced from the radiator.

11. Power control unit mounting means for a tractor which includes a radiator at its forward end, and side frames, the power control unit including a housing and a cable drum projecting forwardly from said housing; said mounting means comprising a rigid upstanding shield which includes a front plate disposed in protective relation ahead of the radiator and side wings projecting rearwardly from the side edges of said plate, the power control unit housing projecting through and being secured to said front plate with the cable drum disposed ahead of the latter, and means securing said side wings to the tractor side frames so that the front plate and housing are spaced from the radiator, the power control unit including control devices extending exteriorly of the housing and disposed rearwardly of said plate whereby said devices are in a zone protected by the shield.

12. A front end implement control device for a tractor which includes side frames, said device comprising a power control unit including a housing and a cable drum supported in connection with and projecting forwardly from the housing, a cable leading from said drum, an upstanding rigid shield having a front plate and side wings, the housing being secured on the plate with the cable drum ahead of the latter, means securing the side wings to the tractor side frames so that the front plate is disposed forwardly of the front end of the tractor, an upstanding frame straddling the shield, a sheave mounted on said frame above the power control unit to receive the cable from the drum, and means securing the frame on the side wings of the shield.

13. A structure as in claim 12 in which said frame includes side beams depending outside the wings and said frame securing means includes trunnions projecting laterally out from the wings near their lower edge and engaging the beams at their lower end.

14. A front end implement control device for a tractor which includes side frames, said device comprising a power control unit including a housing and a cable drum supported in connection with and projecting forwardly from the housing, a cable leading from said drum, an upstanding rigid shield having a front plate and side wings, the housing being secured on the plate with the cable drum ahead of the latter, means securing the side wings to the tractor side frames so that the front plate is disposed forwardly of the front end of the tractor, a frame projecting above the shield, and a sheave mounted on said frame above the power control unit and in position to receive the cable from said drum.

15. Means to mount a power control unit on a tractor at its front end and ahead of the radiator thereof, the tractor including a frame and the unit including a housing; said means comprising a rigid upstanding shield disposed ahead of the radiator in protective relation to the latter, the housing being mounted on and supported by said shield, and means to secure the shield to the frame so that the shield and housing are spaced from the radiator.

ROBERT G. LE TOURNEAU.